Oct. 16, 1951     S. T. ROMEO     2,571,615
AUTO JACK
Filed Nov. 27, 1948
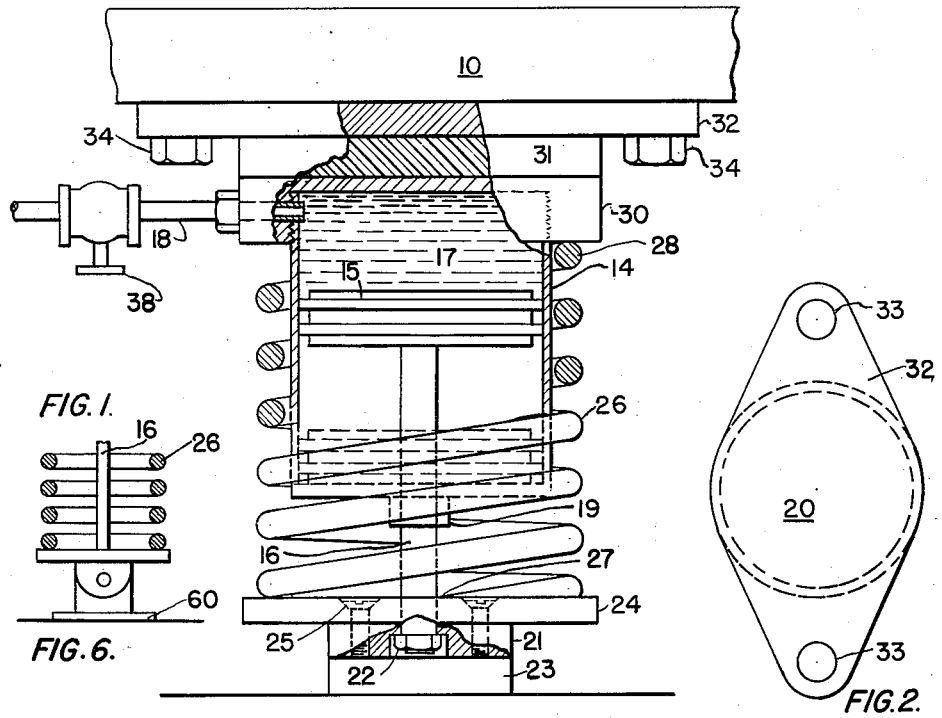
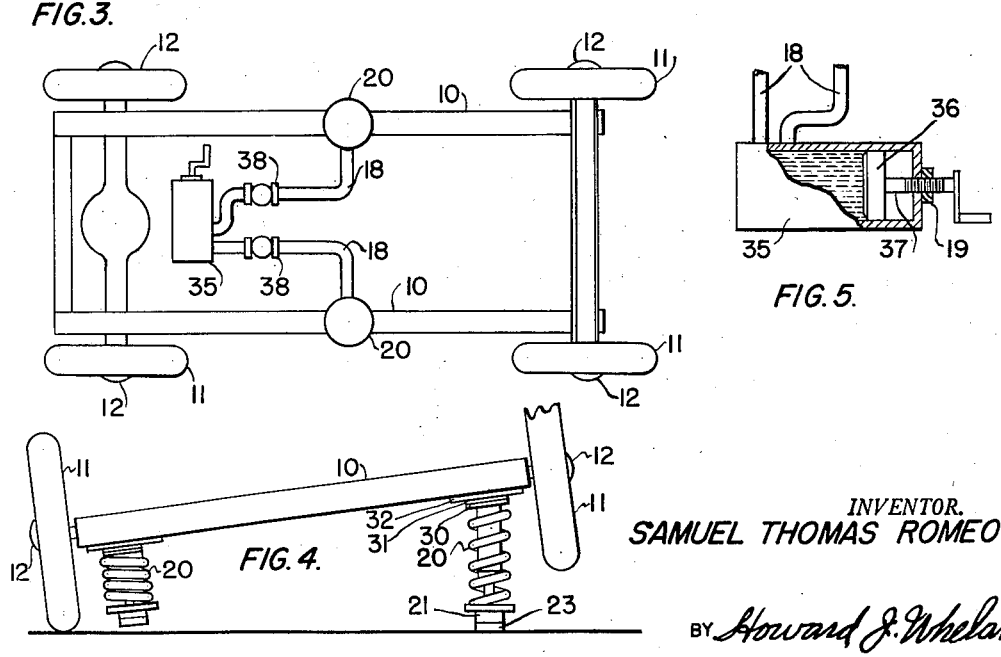
INVENTOR.
SAMUEL THOMAS ROMEO
BY *Howard J. Whelan,*
ATTORNEY Patented Oct. 16, 1951

2,571,615

UNITED STATES PATENT OFFICE 2,571,615

AUTO JACK

Samuel Thomas Romeo, Baltimore, Md.

Application November 27, 1948, Serial No. 62,336

2 Claims. (Cl. 254—86)

This invention relates to lifting jacks for the raising of motor vehicles so their wheels will be above the ground while inspection or repairs to their tires are being made. It particularly refers to the use of such jacks with automobile or motor vehicle where the jack is permanently attached to a selected part of the construction.

It is an object of the invention to provide a new and improved lifting jack for motor vehicles that will avoid one or more of the objections, disadvantages and limitations of the prior art.

Another object of the present invention is to provide a new and improved lifting jack for a motor vehicle that can be permanently attached to the latter, ready for instant use and applicable to a portion of its construction where it may raise the vehicle bodily with all its wheels on one side off the ground at the same time.

A further object of this invention is to provide a new and improved lifting jack for a motor vehicle that may be attached to the construction conveniently and provide for automatic retraction when not in use, so it will be out of the way.

An additional object of the invention is to provide a new and improved lifting jack for a motor vehicle that can adjust itself to unevenness in the roadway and to incidental angular position of the vehicle while being raised or lowered.

Other objects will become apparent as the invention is more fully set forth.

In order to appreciate the invention in its structural form, reference is made to the accompanying drawings which portray a particular form of the invention by way of example. These drawings are explained in the following description so that the functions and principles of the invention may be understood, while the claims indicate the scope thereof.

In the drawings:

Figure 1 is a side elevation of a hydraulic jack embodying this invention;

Figure 2 is a plan view of Figure 1;

Figure 3 is a diagrammatic view of the jack shown connected to a hydraulic system and attached to the chassis of a conventional automobile;

Figure 4 is a diagrammatic view of the jack attached to the chassis as the latter is being raised by the jack;

Figure 5 is a view of the hydraulic tank with parts broken away to show its inner construction; and Figure 6 shows a modified form of pumper plate.

Similar reference characters refer to the same parts throughout the drawings.

In the drawings, a chassis 10 of a four-wheel automobile is shown with its wheels 12 and tires 11 mounted thereon in a conventional manner. The chassis 10 is arranged so a jack may be attached to its middle portions 13 on each side underneath. This provides for two jacks 20, each of which is intended to raise the automobile and the wheels on one side off the ground, while resting on the wheels on the opposite side. This produces a moderate angular positioning of the vehicle about the axis, and leaves the underside of the automobile accessible for any purpose, but particularly for removing or replacing tires on the wheels. Each jack 20 is of the hydraulic type, and operated by hydraulic propelling cylinder 14 in which a piston 15 and piston rod 16 reciprocate. The cylinder 14 is fed with hydraulic fluid 17 through piping 18, and the piston rod 16 passes through a stuffing box 19 mounted on the lower side of the cylinder. The piston rod 16 has a circular ground plate 21 connected to its exterior end portion by a bolt 22 and has a rubber bumper 23 attached to its underside to cushion its contact with the ground. The plate 21 is surmounted by a large washer 24 fastened to it by countersunk screws 25 to hold it rigid thereon. This washer 24 is surmounted by a coil spring 26 under tension and welded to it at one end 27. The other end 28 is welded to the upper portion of the cylinder 14. The purpose of spring 26 is to act as a buffer in the event of the failure of the hydraulic system while the car is jacked up. It also acts as a bumper when the car is let down and it helps in retracting the ground abutment when the jack is withdrawn from operation. The cylinder at this end is screw threaded into a hydraulic chest 30 serving as a base for the cylinder. The chest 30 has a rubber bumper 31 securely attached to it, and to this bumper 31, a flange 32 is attached. The flange 32 is larger than the bumper 31 and has holes 33 drilled in it for the insertion of bolts 34 that attach it to the chassis 10. The cement or other material used for fastening the bumper to metal or whatever material is employed for the flange, chest or plate, is preferably that developed and commercialized by certain rubber cement manufacturers and is of high strength and wearability. It may therefore be used in this instance with propriety and assurance, that it will be serviceable for the purpose.

The piping 18 running from the chest 32 is connected with a hydraulic tank 35 placed under pressure by a pump piston 36 operated by a screw 37. This pump is operated when one of the valves 38 is opened to one of the cylinders 14 by the operator getting ready to actuate the jack on the selected side of the vehicle. The valve 38 is arranged to open the piping to one of the jacks at a time, while closing the other at the same time. When the valve 38 is actuated in this manner the operator starts the screw 37 and proceeds to make the pump raise its pressure. When the pressure is raised sufficiently in the tank 35 and cylinder 14 it pushes the piston 15 and piston rod 16 so that the plate 21 moves with its bumper 23 against the ground and angularly raises the vehicle. This is continued until the automobile is tilted to the proper angle, and pump piston 36 holds the cylinder and pressure at that point. To release the jack 20 the screw 37 is rotated backward to the point where it releases the pressure of the fluid and allows it to withdraw from the cylinder 14 and slowly lower the chassis on that specific side. The opposite side of the chassis is raised and lowered in a similar manner. A modified plate 60 is pivotally attached to rod 16 through plate 61 as shown in Fig. 6.

The valves are available in the commercial world and do not appear to need detailing as far as their structure and operation is concerned.

The use of the jacks at a middle point on the chassis saves considerable time and enables the operator to work conveniently on the tires and wheels of the vehicle. The tires are tilted at an angle and may be removed or replaced more readily than when the automobile is raised vertically. The rubber bumpers enable the jack to accommodate itself to the angular positioning of the vehicle as it is raised, without any excessive stresses being put on it. This is done by the rubber resiliently compressing on one side as the pressure induced by the raising of the vehicle is changed or varied. The retracting spring reduces the intricacy of the structure and makes the return of the jack utilized more or less automatic. The jacks are operated by the valve 37 and avoid the necessity of their being handled and positioned as normally required by other jacks.

While but one general form of the invention is shown in the drawings and described in the specification, it is not desired to limit this application for patent to this particular form, as it is appreciated that other forms of construction could be made that would use the same principles and come within the scope of the appended claims.

Having thus described the invention, what is claimed is:

1. A vehicle jack comprising a cylinder, means for securing said cylinder to the chassis of the vehicle including a rubber bumper between said cylinder and chassis, means for admitting pressure fluid to the upper end of the cylinder, a piston in said cylinder, a piston rod secured to said piston and extending outwardly of said cylinder, a washer attached to the free end of the piston, a rubber bumper secured to said washer and adapted to contact the ground, and a helical spring surrounding said cylinder and having its free ends permanently secured, respectively, to said cylinder and to said washer.

2. A pair of vehicle jacks each of which comprises a cylinder, means for securing said cylinders to opposite middle portions of a vehicle chassis, said means including a rubber bumper between each of said cylinders and the chassis, means for admitting pressure fluid to the upper end of each cylinder, comprising a source of pressure fluid, separate pipe lines from said source to said cylinders, a valve on each pipe line, whereby pressure fluid is selectively supplied to said cylinders by controlling the valve, a piston in each of said cylinders, a piston rod secured thereto and extending outwardly of its cylinder, a washer attached to the free end of each piston, a rubber bumper secured to the washer and adapted to contact the ground, and a helical spring surrounding each cylinder and having its free ends permanently secured to the associated cylinder and washer.

SAMUEL THOMAS ROMEO.

REFERENCES CITED

The following references are of record in the file of this patent:

UNITED STATES PATENTS

| Number | Name | Date |
|---|---|---|
| 1,711,565 | Hatfield | May 7, 1929 |
| 2,416,796 | Dobbs | Mar. 4, 1947 |
| 2,444,272 | Sragal | June 29, 1948 |

FOREIGN PATENTS

| Number | Country | Date |
|---|---|---|
| 528,932 | Great Britain | Nov. 11, 1940 |
| 622,540 | Germany | Nov. 30, 1935 |
| 799,604 | France | Apr. 11, 1936 |